US008427359B1

(12) United States Patent
Bickel et al.

(10) Patent No.: US 8,427,359 B1
(45) Date of Patent: Apr. 23, 2013

(54) TRACKING MOVING RADAR TARGETS WITH PARALLEL, VELOCITY-TUNED FILTERS

(75) Inventors: Douglas L. Bickel, Albuquerque, NM (US); David W. Harmony, Albuquerque, NM (US); Timothy P. Bielek, Albuquerque, NM (US); Jeff A. Hollowell, Albuquerque, NM (US); Margaret S. Murray, Albuquerque, NM (US); Ana Martinez, Bosque Farms, NM (US)

(73) Assignee: Sandia Corporation, Albuquerque, NM (US)

( * ) Notice: Subject to any disclaimer, the term of this patent is extended or adjusted under 35 U.S.C. 154(b) by 290 days.

(21) Appl. No.: 12/985,383

(22) Filed: Jan. 6, 2011

(51) Int. Cl.
*G01S 13/90* (2006.01)
*G01S 13/58* (2006.01)

(52) U.S. Cl.
USPC ........... 342/25 F; 342/25 A; 342/96; 342/104

(58) Field of Classification Search .................. 342/25 F
See application file for complete search history.

(56) References Cited

U.S. PATENT DOCUMENTS

| 3,780,369 | A | * | 12/1973 | Auer et al. ...................... 342/67 |
| 4,633,254 | A | * | 12/1986 | Giaccari .......................... 342/91 |
| 5,107,270 | A | * | 4/1992 | Waters ........................... 342/111 |
| 5,381,151 | A | * | 1/1995 | Boles et al. ...................... 342/21 |
| 5,481,270 | A | * | 1/1996 | Urkowitz et al. ............. 342/101 |
| 6,922,145 | B2 | * | 7/2005 | Piesinger ....................... 340/541 |
| 6,943,724 | B1 | * | 9/2005 | Brace et al. .................. 342/25 B |
| 7,382,310 | B1 | * | 6/2008 | Piesinger ......................... 342/28 |
| 7,764,223 | B2 | * | 7/2010 | Wade ............................ 342/107 |

* cited by examiner

*Primary Examiner* — John B Sotomayor
*Assistant Examiner* — Matthew M Barker
(74) *Attorney, Agent, or Firm* — Scott B. Stahl

(57) ABSTRACT

Radar data associated with radar illumination of a movable target is processed to monitor motion of the target. A plurality of filter operations are performed in parallel on the radar data so that each filter operation produces target image information. The filter operations are defined to have respectively corresponding velocity ranges that differ from one another. The target image information produced by one of the filter operations represents the target more accurately than the target image information produced by the remainder of the filter operations when a current velocity of the target is within the velocity range associated with the one filter operation. In response to the current velocity of the target being within the velocity range associated with the one filter operation, motion of the target is tracked based on the target image information produced by the one filter operation.

20 Claims, 2 Drawing Sheets

TRACKING MOVING RADAR TARGETS WITH PARALLEL, VELOCITY-TUNED FILTERS

This invention was developed under Contract DE-AC04-94AL85000 between Sandia Corporation and the U.S. Department of Energy. The U.S. Government has certain rights in this invention.

FIELD OF THE INVENTION

The present work relates generally to airborne radar systems and, more particularly, to radar tracking of moving targets.

BACKGROUND OF THE INVENTION

Detection and tracking of moving vehicles is an increasingly important remote surveillance objective. Conventional radar systems (e.g., JSTARS) typically excel in ground moving target indication (GMTI) because of their significant wide-area search capabilities. However, existing radars are severely limited in their ability to follow individual moving objects, for example, objects such as vehicles experiencing the type of velocity changes associated with maneuvering in traffic. GMTI radars rely on the vehicle's motion for detection against ground clutter, sweeping out large areas and monitoring many moving objects simultaneously. Tracking with these systems becomes difficult when a vehicle slows down, and is virtually impossible when the vehicle stops.

Relatively little work has been done to address these GMTI problems, particularly in the context of smaller radar systems capable of airborne operation. In particular, conventional radar technology does not provide for airborne radar systems capable of continuously monitoring and tracking an object whether it is moving or stationary.

It is therefore desirable to provide for a relatively small radar system that is suitable for airborne operation and is capable of continuously monitoring and tracking a single moving object.

DETAILED DESCRIPTION

Exemplary embodiments of the present work provide for processing radar information to permit tracking mobile high-value targets over realistic velocity changes such as experienced by a vehicle while maneuvering in traffic. Appropriately collected coherent radar data is continuously and simultaneously processed in several ways, which permits the processing to be "tuned" to different velocities. Some embodiments simultaneously process the same set of radar data with a plurality of conventional radar processing filters (also referred to herein as processing modes, or simply modes) arranged in parallel. For example, various embodiments employ various parallel combinations of conventional processing modes such as VideoSAR processing (as described in U.S. Pat. No. 7,498,968, incorporated herein by reference), exoclutter processing, and clutter attenuated Doppler processing. In contrast, conventional airborne radar systems typically use a single radar processing filter combined with detection and tracking stages.

An enhanced set of detection and location information is produced in response to the parallel processing operations, and is provided to a tracking filter (tracker) that maintains information about the position of the vehicle. The tracking filter implements a tracking algorithm that uses the received information to provide enhanced tracking performance. A conventional antenna pointing algorithm is updated based on the tracking information to keep the object of interest within the radar beam.

As an example of "tuning" the processing, the exoclutter mode may provide the best information for detection and tracking at relatively high vehicle velocities, while clutter attenuated Doppler and VideoSAR modes provide better information for detection and tracking as the vehicle slows to a stop. The VideoSAR mode provides information that permits detection and tracking contact to be maintained even when the vehicle is stopped. Even though a given mode may not be optimal for the current vehicle velocity, it may still provide information that can improve performance. For example, shadow information provided by the VideoSAR mode may be used to enhance detection and location of relatively fast moving vehicles that are optimally processed by the exoclutter mode.

Some embodiments use feedback information from the tracking filter to support focusing the moving object. The focused object can be used to improve detection or to provide situational awareness information to an operator, for example, by displaying the focused object at its true location within a VideoSAR image.

Figure 1:
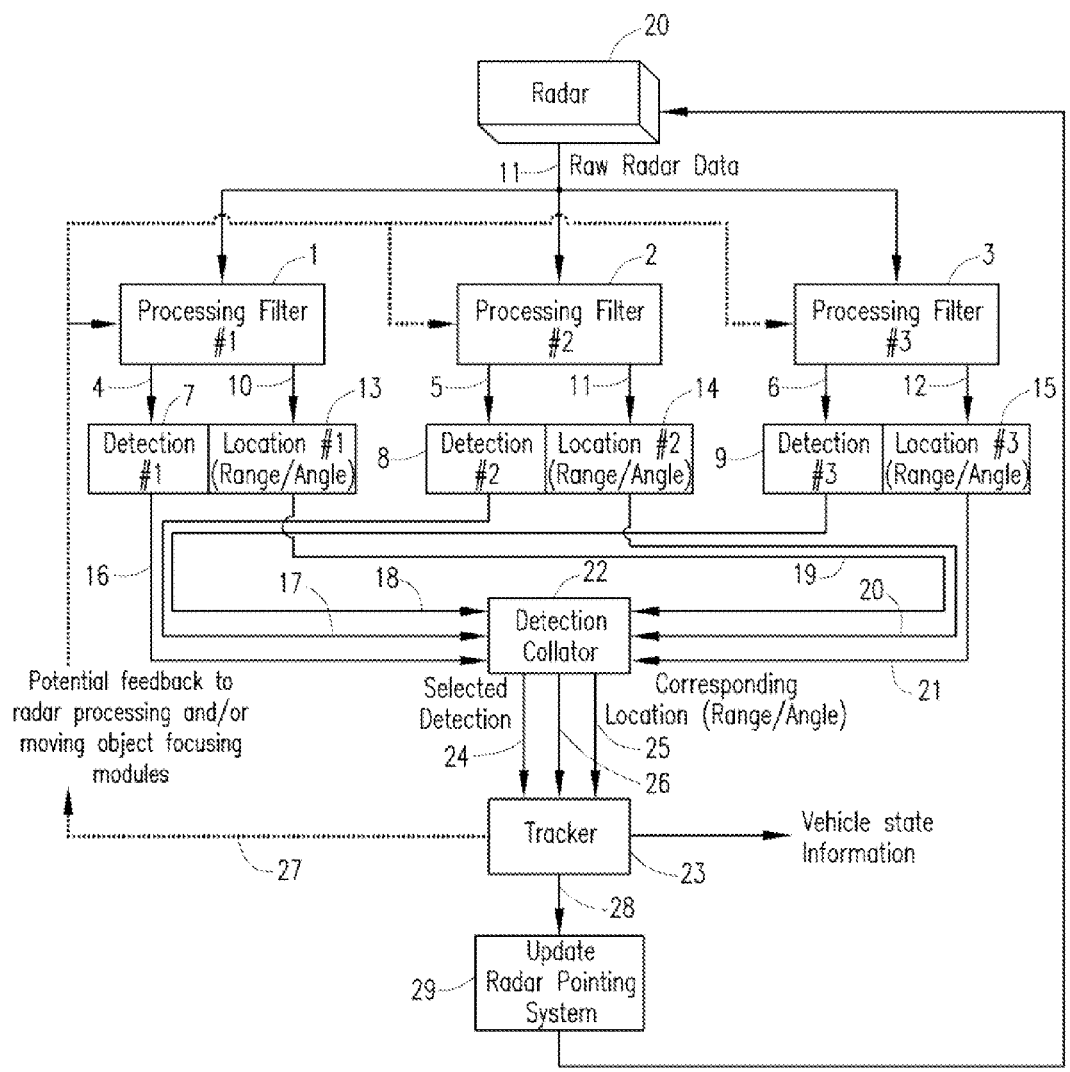
FIG. 1 diagrammatically illustrates an airborne radar system according to exemplary embodiments of the present work.

As mentioned above, exemplary embodiments of the present work provide for simultaneous processing of radar data, where the various parallel processing modes are "tuned" to respectively corresponding ranges of object speed, including the stopped "range". FIG. 1 diagrammatically illustrates an airborne radar system according to exemplary embodiments of the present work. The system includes a radar front end 20 having conventional coherent radar properties and multiple channels to support conventional direction of arrival processing. In some embodiments, the radar front end 20 receives radar echo signals and processes them in conventional fashion to capture associated radar data. This "raw" radar data, together with conventional motion measurement information, is applied at to various parallel processing filters, which are respectively "tuned" to support tracking objects that are moving at velocities in respective velocity ranges. Although FIG. 1 shows three processing filters, various embodiments use various numbers of processing filters.

In some embodiments, filter 1 implements conventional exoclutter GMTI processing for use with fast moving objects; filter 2 implements conventional endoclutter GMTI for use with medium to slow moving objects, and filter 3 implements VideoSAR for use with slow to stopped objects. Examples of conventional processing filters used in various other embodiments include: a range-Doppler processing filter; a focused range-Doppler processing filter; a SAR processing filter; and a space-time adaptive processing (STAP) filter. Various embodiments use various numbers of processing filters in various parallel combinations. In various embodiments, the various parallel processing filters respectively implement various CPIs (coherent processing intervals). Some embodiments use multiple VideoSAR processing filters within the parallel filter combination, where the various VideoSAR filters respectively use various different CPI (coherent processing interval) lengths to enhance detection resolution between targets moving at various different, relatively slower velocities. In some embodiments, the various parallel processing filters respectively implement various different focusings, based upon the respective velocity ranges to which they are "tuned". For example, in a processing filter "tuned" to a range of relatively high velocities, conventional corrections for aliased movers can be applied.

The respective outputs 4-6 of the filters 1-3 represent radar images that are sent to respectively corresponding detection stages (or detectors) 7-9. The detection stages 7-9 operate in conventional fashion in some embodiments, comparing the processed radar data at 4-6 against a threshold. The threshold is adjusted by conventional continuous false alarm rate (CFAR) processing in some embodiments. Some embodiments use a simple conventional template matching technique (e.g., size, etc.) to reduce false alarms.

Each of filters 1-3 also performs location processing of the multiple channel data. The results 10-12 of the location processing respectively performed by filters 1-3 are forwarded to respectively corresponding location processors 13-15. The location processors 13-15 operate in conventional fashion in some embodiments, estimating range-angle-Doppler information for each detection (i.e., for each CPI).

The detection information output at 16-18 by the respective detection stages 7-9, and the location information output at 19-21 by the respective location processors 13-15 is input to a detection collator 22. The detection collator 22 selects the best of the current detections 16-18, according to a criterion such as, e.g., signal-to-clutter-plus-noise. The selected detection 24 is then passed to a tracking stage (tracker) 23. One of the current images at 4-6 will typically be clearly best in the signal-to-clutter-plus noise sense. The detection collator 22 selects the detection information (i.e., either 16, 17 or 18) for that image and passes it (at 24) to the tracker 23. This cooperation of the detection collator 22 with the detection stages 7-9 effectively identifies the processing filter whose velocity range includes the current velocity of the target. Together with the selected detection 24, the detection collator 22 also passes to the tracker 23 the corresponding set 25 of location information (i.e., either 19, 20 or 21) and the corresponding signal-to-clutter-plus-noise ratio 26.

The tracker 23 generates state vector information for the object corresponding to the selected detection 24. State vector information includes position, velocity, and acceleration information. In some embodiments, the tracker 23 uses all of the detections that it receives for a given target. In some embodiments, the tracker 23 uses a suitable filter criterion to discard some of the received detections. In general, the tracker 23 may use conventional tracking techniques. However, the tracker 23 also has added capabilities to handle stopped targets and target accelerations (i.e., going from the stopped state into a motion state or vice-versa). These capabilities are now described.

As a moving target object slows, the detections will transition through the various processing filters tuned to the various velocity ranges. Because the filters are tuned to different velocity ranges, they also have different associated time scales. The time scales respectively associated with filters tuned to various velocity ranges may vary from, for example, fractions of a second to several seconds. Consequently, there will be time gaps between selected detections 24 when a slowing vehicle disappears in one filter output and appears in the next filter output. For example, during the time gap, the detection collator 22 will not identify any image that satisfies a minimum signal-to-clutter-plus-noise threshold. The tracker 23 must be able to link detections that disappear from one filter to new detections that appear from another filter. For a slowing vehicle, some embodiments of tracker 23 project the target track forward in time until it stops, and then feed back information to dynamically prime the slower filters to facilitate comparing detections to the predicted track. The filter priming is achieved in some embodiments, by adaptively adjusting brightness thresholds and contrast ratios in localized regions of the filter's range-Doppler image based on the predicted track. Feedback information indicative of these filter-priming adjustments is shown diagrammatically at 27.

In the case of a vehicle accelerating from a stop, the tracker 23 must also deal with filters with different time scales. Initial movement of a vehicle will first be detected in the shorter-time, higher velocity range filters before any motion is apparent in the longer-time, slower velocity range filters. New detections in the short-time filters should then be tied to detections in the long-time filters that will eventually disappear at some point in the future as the target keeps moving. In some embodiments, the tracker 23 projects the target track backward in time, rather than forward in time as described above for slowing vehicles. The backward time projection primes the long-time filter for eventual loss of detection as the target spends a larger fraction of the time window in moving rather than stationary states.

In some embodiments, the tracker 23 predicts motion using a conventional prediction filter. The predicted motion information (state vector) produced by the tracker 23 is also provided at 28 to update the pointing system of the radar at 29, as is conventional, to permit the pointing system to maintain adequate illumination of the target of interest and provide optimal detection conditions. In some embodiments, the antenna pointing system is conventional, with sufficient degrees of freedom to follow moving objects at all times.

Some embodiments provide improvements in focusing the moving object. Focusing is conventionally performed in processing filters such as those described above with respect to FIG. 1. Focusing depends upon knowing the relative motion of the object and the radar. It improves detection because, for example, the energy from the object is not smeared out as much after focusing, meaning that it is concentrated in a smaller area of the image and is therefore more likely to trigger the threshold of the detector. Conventionally, the motion of the radar (as carried on the aircraft) is known, but the motion of the object is not, so the object is assumed to be stationary for focusing purposes. There are various known techniques to estimate the motion of the object from the raw radar data, but they often perform poorly.

According to various embodiments, the processing filters such as shown at 1-3 in FIG. 1 may include additional functionality to receive target state vector information from the tracking stage 23, and to use that information to improve focusing. This feedback of the target state vector information is shown diagrammatically at 27. As described above, a moving object of interest lies typically in only one of the processing filters 1-3 at a given time. That particular filter applies focusing for the moving object. The processing filter receives the target state vector information (at 27) from the tracker 23, together with a target range estimate (not explicitly shown), which is conventionally available from the aircraft motion measurement system. The processing filter calculates an estimated range to the target at each pulse. This calculation includes interpolating the feedback position, velocity and acceleration information to the time of the pulse, using the interpolated information to calculate a relative range of the object, and adding the relative range to the range estimated by the aircraft motion measurement system. The resulting estimated range calculation is used to correct the phase of the moving object for each pulse. The focusing operation also results in the object being moved back to its proper location in the (video)SAR image.

In some embodiments, the parallel processing filters are tuned such that at least some adjacent pairs of the velocity ranges overlap one another. In some embodiments, all adjacent pairs overlap one another. In some embodiments, some adjacent pairs overlap one another, and other adjacent pairs substantially adjoin one another without overlap. In some embodiments, all adjacent pairs substantially adjoin one another without overlap.

Figure 2:
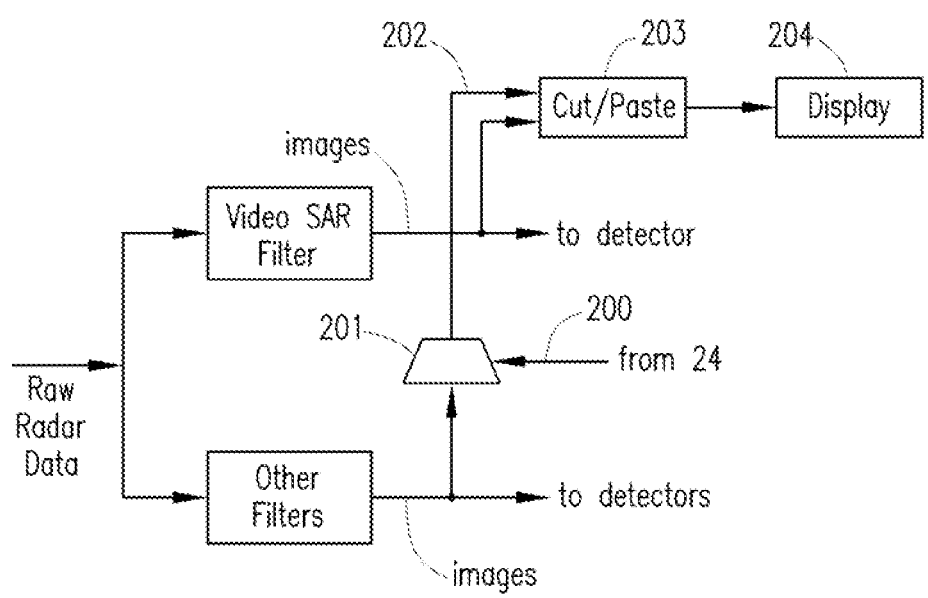
FIG. 2 diagrammatically illustrates an airborne radar system according to further exemplary embodiments of the present work.

Some embodiments exploit the fact that a VideoSAR filter will always produce a focused image of the stationary background, thus providing good visual context to the area being observed. Although a moving object is typically not visible in the VideoSAR filter, it will, as mentioned above, be focused in an image produced by another of the filters. Accordingly, a suitable combiner may be used to combine the stationary background provided by the VideoSAR image with the image of the moving object. The focused moving object is cut out of the latter image, and pasted into the VideoSAR image of the stationary background. The resultant image is easier for an operator to interpret as it is visually displayed to the operator. This is illustrated diagrammatically in FIG. 2. At 200, information indicative of the currently selected filter is fed from the detection collator 24 (see also FIG. 1) to a selector 201, which selects the image from the selected filter. The selected image 202 is routed to an image combiner 203 that also receives the image produced by the VideoSAR filter. The image combiner 203 cuts the target out of the selected image 202, and pastes it into the VideoSAR image. The resulting image is then provided for display at 204.

Although exemplary embodiments are described above in detail, this does not limit the scope of the present work, which can be practiced in a variety of embodiments.

What is claimed is:

1. An apparatus for processing radar data to monitor motion of a movable target, comprising:
    a plurality of processing filters for receiving and processing in parallel radar data provided by a radar front end apparatus, each said processing filter configured to produce target image information in response to the received radar data, said processing filters having associated therewith respectively corresponding velocity ranges that differ from one another such that the target image information produced by one of said processing filters represents the target more accurately than the target image information produced by the remainder of said processing filters when a current velocity of the target is within the velocity range associated with said one processing filter; and
    a tracker configured to track motion of the target based on target image information, said tracker coupled to said processing filters and further configured to track said target motion based on the target image information produced by said one processing filter when the current velocity of the target is within the velocity range associated with said one processing filter.

2. The apparatus of claim 1, wherein said plurality of processing filters includes a VideoSAR filter, and one of an exoclutter ground moving target indication (GMTI) filter, an endoclutter GMTI filter, a range-Doppler filter, a focused range-Doppler filter, a SAR filter, and a space-time adaptive processing (STAP) filter.

3. The apparatus of claim 1, including a selection portion coupled to said plurality of processing filters and said tracker, said selection portion configured to identify said one processing filter in response to the target image information produced by said plurality of processing filters.

4. The apparatus of claim 3, wherein said selection portion includes a plurality of detectors respectively coupled to said plurality of processing filters, each said detector configured to produce detection information based on the associated target image information, said selection portion including a detection collator coupled to said detectors and configured to identify said one processing filter based on the detection information produced by said detectors, and to provide to said tracker the detection information associated with said one processing filter.

5. The apparatus of claim 1, wherein said tracker is further coupled to said processing filters to provide to said processing filters feedback information indicative of said target motion, and wherein said processing filters are configured to perform, in said production of the target image information, focusing based on said feedback information.

6. The apparatus of claim 1, wherein said one processing filter is a filter other than a VideoSAR filter, and another of said processing filters is a VideoSAR filter, and including an image combiner coupled to said processing filters for combining a portion of the target image information associated with said VideoSAR filter with a portion of the target image information associated with said one filter to produce combined target image information, and a display coupled to said image combiner for displaying a visual image in response to said combined target image information.

7. The apparatus of claim 1, wherein said tracker is further coupled to said processing filters to provide to another of said processing filters feedback information to adjust said another processing filter dynamically when the target velocity approaches the velocity range associated with said another processing filter.

8. The apparatus of claim 7, wherein said feedback information is indicative of one of a brightness threshold and a contrast ratio to be used by said another processing filter.

9. The apparatus of claim 1, provided within an airborne radar system.

10. A radar system for monitoring motion of a movable target, comprising:
    a front end portion for capturing radar data associated with radar illumination of the target;
    a plurality of processing filters coupled to said front end portion for receiving and processing the radar data in parallel, each said processing filter configured to produce target image information in response to the received radar data, said processing filters having associated therewith respectively corresponding velocity ranges that differ from one another such that the target image information produced by one of said processing filters represents the target more accurately than the target image information produced by the remainder of said processing filters when a current velocity of the target is within the velocity range associated with said one processing filter; and
    a tracker configured to track motion of the target based on target image information, said tracker coupled to said processing filters and further configured to track said target motion based on the target image information produced by said one processing filter when the current velocity of the target is within the velocity range associated with said one processing filter.

11. The apparatus of claim 10, wherein said tracker is further coupled to said processing filters to provide to said processing filters feedback information indicative of said target motion, wherein said processing filters are configured to perform, in said production of the target image information, focusing based on said feedback information.

12. The apparatus of claim 10, wherein said tracker is further coupled to said processing filters to provide to another of said processing filters feedback information to adjust said another processing filter dynamically when the target velocity approaches the velocity range associated with said another processing filter.

13. A method of processing radar data to monitor motion of a movable target, comprising:
    providing radar data associated with radar illumination of the target;
    performing a plurality of filter operations on the radar data in parallel so that each said filter operation produces target image information;
    defining said filter operations to have respectively corresponding velocity ranges that differ from one another such that the target image information produced by one of said filter operations represents the target more accurately than the target image information produced by the remainder of said filter operations when a current velocity of the target is within the velocity range associated with said one filter operation; and
    in response to a condition that the current velocity of the target is within the velocity range associated with said one filter operation, tracking motion of the target based on the target image information produced by said one filter operation.

14. The method of claim 13, wherein said plurality of filter operations includes a VideoSAR filter operation, and one of an exoclutter ground moving target indication (GMTI) filter operation, an endoclutter GMTI filter operation, a range-Doppler filter operation, a focused range-Doppler filter operation, a SAR filter operation, and a space-time adaptive processing (STAP) filter operation.

15. The method of claim 13, including identifying said one filter operation in response to the target image information produced by said plurality of filter operations.

16. The method of claim 15, wherein said identifying includes producing detection information in response to the target image information associated with each said filter operation, and identifying said one filter operation based on the detection information.

17. The method of claim 13, wherein said tracking provides information indicative of said target motion, and wherein said filter operations include, in the production of the target image information, focusing based on said information indicative of target motion.

18. The method of claim 13, wherein said one filter operation is a filter operation other than a VideoSAR filter operation, and another of said filter operations is a VideoSAR filter operation, and including combining a portion of the target image information associated with said VideoSAR filter operation with a portion of the target image information associated with said one filter operation to produce combined target image information, and displaying a visual image in response to said combined target image information.

19. The method of claim 13, including adjusting another of said filter operations dynamically when the target velocity approaches the velocity range associated with said another filter operation.

20. The method of claim 19, wherein said adjusting includes adjusting one of a brightness threshold and a contrast ratio used by said another filter operation.

* * * * *